(12) United States Patent
Sanford, Jr.

(10) Patent No.: US 8,974,071 B2
(45) Date of Patent: Mar. 10, 2015

(54) LIGHTED ACCESSORY FOR PLANTER

(71) Applicant: Sammie J. Sanford, Jr., Fairburn, GA (US)

(72) Inventor: Sammie J. Sanford, Jr., Fairburn, GA (US)

( * ) Notice: Subject to any disclaimer, the term of this patent is extended or adjusted under 35 U.S.C. 154(b) by 45 days.

(21) Appl. No.: 13/783,527

(22) Filed: Mar. 4, 2013

(65) Prior Publication Data

US 2013/0229823 A1 Sep. 5, 2013

Related U.S. Application Data

(60) Provisional application No. 61/606,770, filed on Mar. 5, 2012.

(51) Int. Cl.
| | |
|---|---|
| *F21S 4/00* | (2006.01) |
| *F21V 33/00* | (2006.01) |
| *A01G 9/02* | (2006.01) |
| *F21S 9/03* | (2006.01) |
| *F21V 8/00* | (2006.01) |
| *F21W 121/00* | (2006.01) |
| *F21Y 101/02* | (2006.01) |

(52) U.S. Cl.
CPC .............. *F21V 33/0028* (2013.01); *A01G 9/02* (2013.01); *F21S 4/007* (2013.01); *F21S 9/03* (2013.01); *F21V 2008/001* (2013.01); *F21W 2121/00* (2013.01); *F21Y 2101/02* (2013.01); *Y10S 362/805* (2013.01)
USPC ............................ 362/122; 362/391; 362/805

(58) Field of Classification Search
CPC F21W 2121/04; F21V 33/0028; F21V 21/32; F21S 4/001; F21S 4/005; F21S 4/007; A47G 7/00
USPC .......................... 362/122, 391, 563, 154, 805
See application file for complete search history.

(56) References Cited

U.S. PATENT DOCUMENTS

| | | | | |
|---|---|---|---|---|
| 3,500,036 | A | * | 3/1970 | Szentveri ...................... 362/152 |
| 5,951,154 | A | * | 9/1999 | Carel et al. ................... 362/431 |
| 6,076,940 | A | * | 6/2000 | Sanford, Jr. .................. 362/253 |
| 7,347,606 | B1 | * | 3/2008 | Patten .......................... 362/565 |
| 2009/0034244 | A1 | * | 2/2009 | Tabarelli De Fatis ......... 362/154 |
| 2010/0141156 | A1 | * | 6/2010 | Canino et al. ................. 315/154 |

* cited by examiner

*Primary Examiner* — Peggy Neils
(74) *Attorney, Agent, or Firm* — Fildes & Outland, P.C.

(57) ABSTRACT

A lighted accessory for a planter includes a flexible split ring that has first and second adjustably spaceable ends that define a ring of variable diameter. The flexible split ring has a curved cross-sectional shape and is fittable on an upper edge of a planter. A light source is mounted on the annular ring providing illumination of the planter. The lighted accessory is fittable on a range of sizes of planters.

20 Claims, 2 Drawing Sheets

LIGHTED ACCESSORY FOR PLANTER

CROSS REFERENCE TO RELATED APPLICATION

This application claims the priority of U.S. Provisional Application No. 61/606,770 filed Mar. 5, 2012.

TECHNICAL FIELD

This invention relates to accent lighting of plants and in particular to a lighted accessory that is fittable on an existing planter or flower pot.

BACKGROUND OF THE INVENTION

It is known in the art relating to accent lighting to illuminate a plant with a light source, such as a spotlight, track lighting, or other artificial lighting means. Such light sources are independent of a planter or container for the plant. While this lighting does an effective job of illuminating the plant, the installation of this type of lighting can be complicated and expensive.

It is also known to provide planters with lighting means for lighting a plant therein. The planters use indirect lighting to illuminate the plant within the planter. Also, there are planters that have means for directly lighting a plant therein. However, such planters cannot be used with existing planters. Accordingly, a light accessory that is mountable on an existing planter and directly illuminates the plant should fill a recognized commercial need.

SUMMARY OF THE INVENTION

The present invention provides a lighted accessory for a planter that is easily mountable on various sizes of existing planters. The lighted accessory also has a high degree of ornamental and decorative value. The lighted accessory may directly light both the planter and a plant located within the planter.

More particularly, a lighted accessory for a planter in accordance with the invention includes a flexible split ring that has first and second adjustably spaceable ends that define a ring of variable diameter. The flexible split ring has a curved cross-sectional shape and is fittable on an upper edge of a planter. A light source is mounted on the annular ring providing illumination of the planter. The lighted accessory is fittable on a range of sizes of planters.

Optionally, the lighted accessory may include a plurality of apertures disposed in the flexible split ring allowing for transmission of light through the ring and providing both upward illumination of a space above the planter and downward illumination of the planter.

The cross-sectional shape of the flexible split ring may be an inverted u-shape. In this embodiment, the flexible split ring may include an inner and outer edge separated by a curved recess. A plurality of apertures may be disposed in the curved recess.

Alternatively, the cross-sectional shape of the flexible split ring may be an s-shape. In this embodiment, the flexible split ring may include an inwardly disposed, upwardly inverted curve fittable over the upper edge of the planter, and an adjacent, outwardly disposed, downwardly inverted curve that forms a receptacle for the light source. A plurality of apertures may be formed in the outwardly disposed curve.

In yet another alternative, the cross-sectional shape of the flexible split ring may be an m-shape. In this embodiment, the flexible split ring may include an inwardly disposed, upwardly inverted curve fittable over the upper edge of the planter, and an adjacent, outwardly disposed, upwardly inverted curve that forms a receptacle for the light source. A plurality of apertures may be formed in the outwardly disposed curve.

Optionally, the light source may be one of an incandescent light source, an LED light source, and a fiber optic light assembly. The light source may include a plurality of individual lights. The plurality of individual lights may be electrically connected. The light source may include a translucent rope containing one or more lights. The light source may be mounted in the apertures that extend through the annular ring, or the light source may be positioned adjacent the apertures that extend through the annular ring. The light source may be powered by one of a battery, household electricity, and solar power.

In another embodiment, a lighted accessory for a planter in accordance with the invention includes a flexible, elongated body having a curved cross-sectional shape and first and second adjustably spaceable ends that are opposable to define a ring-like shape. The elongated body includes a mounting portion and an adjacent lighting portion. The mounting portion is fittable on an upper edge of a planter. A light source is mounted in the lighting portion providing illumination of the planter. The lighting portion may include a plurality of apertures allowing for transmission of light through the elongated body providing both upward illumination of a space above the planter and downward illumination of the planter.

These and other features and advantages of the invention will be more fully understood from the following detailed description of the invention taken together with the accompanying drawings.

DETAILED DESCRIPTION OF THE INVENTION

Figure 1:
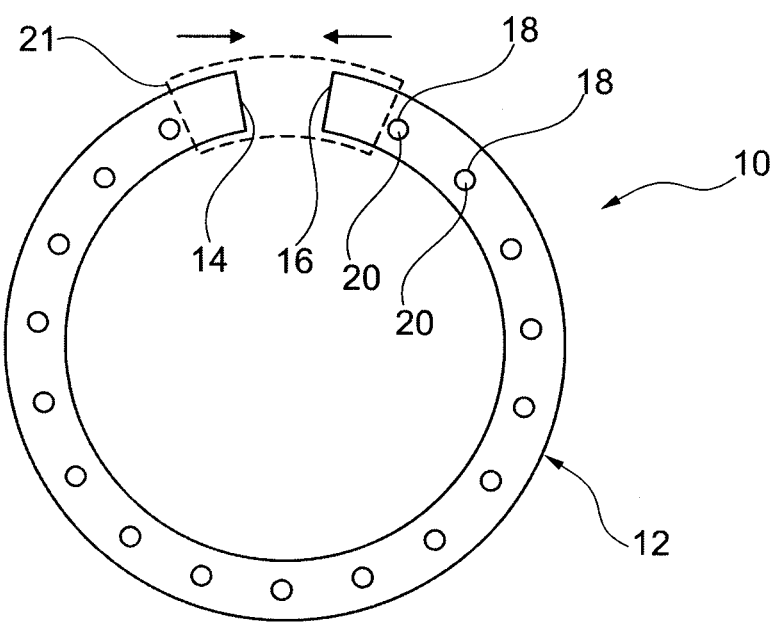
FIG. 1 is a perspective view of a lighted accessory for a planter in accordance with the present invention.

Referring now to the drawings in detail, numeral 10 generally indicates a lighted accessory mountable on an existing planter that is adjustably mountable on various sizes of existing planters. The lighted accessory 10 also may illuminate both the planter and a plant within the planter.

Figure 2:
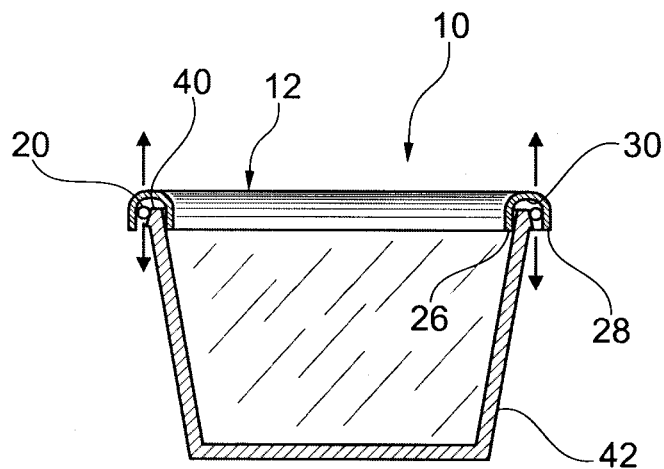
FIG. 2 is a sectional view of the lighted accessory mounted on an upper edge of an existing planter.

Referring to FIGS. 1 and 2, a lighted accessory 10 for a planter includes a flexible split ring 12 fittable on an upper edge of an existing planter, flower pot, or similar. The flexible split ring 12 has a curved cross-sectional shape and first and second adjustably spaceable ends 14, 16 that cooperably define a ring of variable diameter, allowing the lighted accessory 10 to be fittable on a range of sizes of planters or pots. The flexible split ring 12 may be made of a shapeable material such as a plastics material, a rubber-like material, or similar, and may be formed by molding or similar. The shapeable characteristic of the flexible split ring 12 allows it to be adjustable in diameter to accommodate a range of planter or pot diameters.

A plurality of apertures 18 may be disposed in the ring to allow for transmission of light through the split ring 12. Each aperture 18 may be an elongated slot and/or may have a circular, oval, rectangular, or other similarly suitable size and shape that allows light to pass therethrough.

A light source 20 is mounted on and disposed around the split ring 12 and may provide one or both of upward illumination of a space above the planter (such as a space partially or wholly occupied by a plant disposed in the planter) and downward illumination of the planter including the outer wall(s) of the planter or pot. The light source 20 may be an incandescent light source, an LED light source, a fiber optic light assembly, or similar. The light source 20 may include a plurality of individual lights, and the plurality of individual lights may be electrically connected. The light source 20 also may include a translucent, hollow rope or ring containing one or more lights therein. The light source 20 may be mounted in the apertures 18 that extend through the split ring 12 (such as in the case that the light source includes a plurality of individual lights), or the light source may be positioned adjacent the apertures that extend through the split ring (such as in the case that the light source includes one or more lights housed within a rope or ring). The light source 20 may be powered by a battery, household electricity, solar power, or similar. Electrical power may be provided to the light source 20 through wiring as is conventional, and the wiring may be at least partially hidden underneath the split ring 12. The split ring 12 also may include a battery mount for mounting batteries on the ring, and may include a switch for controlling the illumination provided by the light source. A connector 21, shown in phantom, having the same cross-sectional shape as the split ring 12, may be provided to fill the space below ends 14, 16. Connector 21 is fittable around the ends 14, 16.

The cross-sectional shape of the split ring 12 may be as simple as an inverted u-shape or a more complex shape resembling an s-shaped curve or an m-shaped curve. In one embodiment shown in FIG. 2, the split ring 12 is an inverted u-shape. In this embodiment, the split ring 12 includes an inner edge 26 and an outer edge 28 separated by a curved recess 30, and the plurality of apertures 18, if present, are disposed in the curved recess. The apertures, if present, may be provided on a diameter larger than the diameter of the planter or pot that the ring sits on (i.e., closer to the outer edge 28 of the ring) so that the light provided by the light source is directed downwardly outside the planter in addition to being directed through the apertures.

Figure 3:
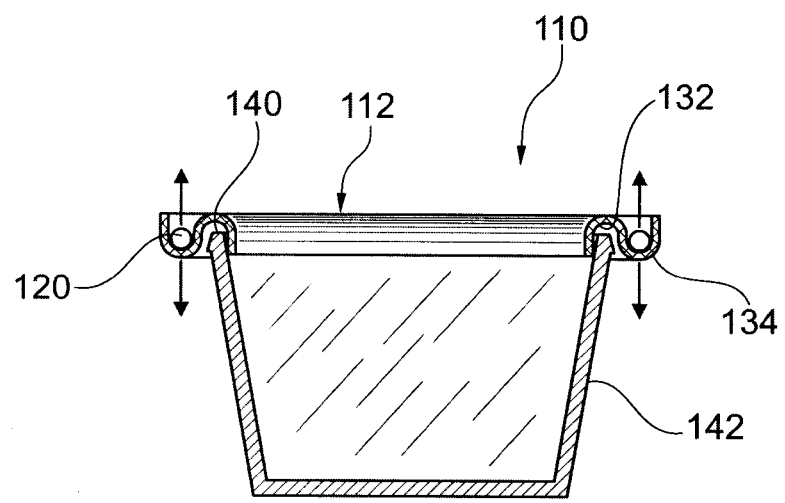
FIG. 3 is a sectional view of another embodiment of a lighted accessory in accordance with the present invention mounted on an upper edge of an existing planter.

In another embodiment 110 shown in FIG. 3, the cross-sectional shape of the split ring 112 is an s-shape. In this embodiment, the split ring 112 includes an inwardly disposed, upwardly inverted curve 132 fittable over the upper edge 140 of the planter or pot 142, and an adjacent, outwardly disposed, downwardly inverted curve 134 that forms a receptacle for the light source 120. In the s-shaped construction, the light source 120 is mounted in the outwardly disposed curve 134 beyond the edge of a planter or flower pot on which the ring is mounted. The plurality of apertures, if present, are formed in the outwardly disposed curve 134, allowing the illumination from the light source 120 to reach the wall(s) of the planter or flower pot.

Figure 4:
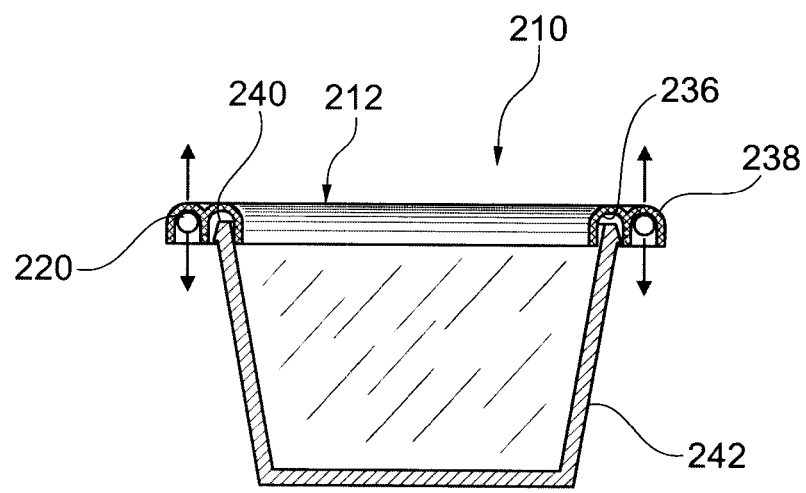
FIG. 4 is a sectional view of yet another embodiment of a lighted accessory in accordance with the present invention mounted on an upper edge of an existing planter.

In yet another embodiment 210 shown in FIG. 4, the cross-sectional shape of the split ring 212 is an m-shape. In this embodiment, the split ring 212 includes an inwardly disposed, upwardly inverted curve 236 fittable over the upper edge 240 of the planter or pot 242, and an adjacent, outwardly disposed, upwardly inverted curve 238 that forms a shallow receptacle for the light source 220. The plurality of apertures, if present, are formed in the outwardly disposed curve 238, allowing the illumination from the light source 220 to reach the space above the planter or pot to illuminate a plant disposed within the planter or pot.

In use, the lighted accessory 10 is mounted on the upper edge 40 of a planter or pot 42 as shown, for example, in FIG. 2. When illuminated, the light source 20 may project light both upwardly above the upper edge of the planter or pot 42 and downwardly along the sidewall of the planter or pot.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A lighted accessory for a planter comprising:
   a flexible split ring that has first and second adjustably spaceable ends that define a ring of variable diameter, the flexible split ring having a curved cross-sectional shape and being fittable on an upper edge of a planter; and
   a light source mounted on the annular ring providing illumination of the planter;
   wherein the lighted accessory is fittable on a range of sizes of planters.

2. The lighted accessory of claim 1, including a plurality of apertures disposed in the flexible split ring allowing for transmission of light through the ring and providing both upward illumination of a space above the planter and downward illumination of the planter.

3. The lighted accessory of claim 1, wherein the cross-sectional shape is an inverted u-shape.

4. The lighted accessory of claim 3, wherein the flexible split ring includes an inner and outer edge separated by a curved recess.

5. The lighted accessory of claim 4, wherein a plurality of apertures are disposed in the curved recess.

6. The lighted accessory of claim 1, wherein the cross-sectional shape is an s-shape.

7. The lighted accessory of claim 6, wherein the flexible split ring includes an inwardly disposed, upwardly inverted curve fittable over the upper edge of the planter, and an adjacent, outwardly disposed, downwardly inverted curve that forms a receptacle for the light source.

8. The lighted accessory of claim 7, wherein a plurality of apertures are formed in the outwardly disposed curve.

9. The lighted accessory of claim 1, wherein the cross-sectional shape is an m-shape.

10. The lighted accessory of claim 9, wherein the flexible split ring includes an inwardly disposed, upwardly inverted curve fittable over the upper edge of the planter, and an adjacent, outwardly disposed, upwardly inverted curve that forms a receptacle for the light source.

11. The lighted accessory of claim 1, wherein the light source is one of an incandescent light source, an LED light source, and a fiber optic light assembly.

12. The lighted accessory of claim 11, wherein the light source includes a plurality of individual lights.

13. The lighted accessory of claim 12, wherein the plurality of individual lights are electrically connected.

14. The lighted accessory of claim 11, wherein the light source includes a translucent rope containing one or more lights.

15. The lighted accessory of claim 2, wherein the light source is mounted in the apertures that extend through the flexible split ring.

16. The lighted accessory of claim 2, wherein the light source is positioned adjacent the apertures that extend through the flexible split ring.

17. The lighted accessory of claim 1, wherein the light source is powered by one of a battery, household electricity, and solar power.

18. A lighted accessory for a planter comprising:
   a flexible, elongated body having a curved cross-sectional shape and first and second adjustably spaceable ends that are opposable to define a ring-like shape;
   the elongated body including a mounting portion and an adjacent lighting portion;
   the mounting portion being fittable on an upper edge of a planter;
   a light source mounted in the lighting portion providing illumination of the planter.

19. The lighted accessory of claim 18, wherein the lighting portion includes a plurality of apertures allowing for transmission of light through the elongated body providing both upward illumination of a space above the planter and downward illumination of the planter.

20. The lighted accessory of claim 18, wherein the light source is one of an incandescent light source, an LED light source, and a fiber optic light assembly.

\* \* \* \* \*